June 29, 1965  R. R. RADER  3,191,398
APPARATUS FOR CONGEALING LIQUIDS HAVING A MOVING SCRAPER
Filed Dec. 7, 1962  5 Sheets-Sheet 1

INVENTOR.
ROBERT RICHARD RADER
BY
ATTORNEYS

INVENTOR.
ROBERT RICHARD RADER
BY
Barnes, Kisselle, Raisch & Choate
ATTORNEYS

INVENTOR.
ROBERT RICHARD RADER
BY
ATTORNEYS

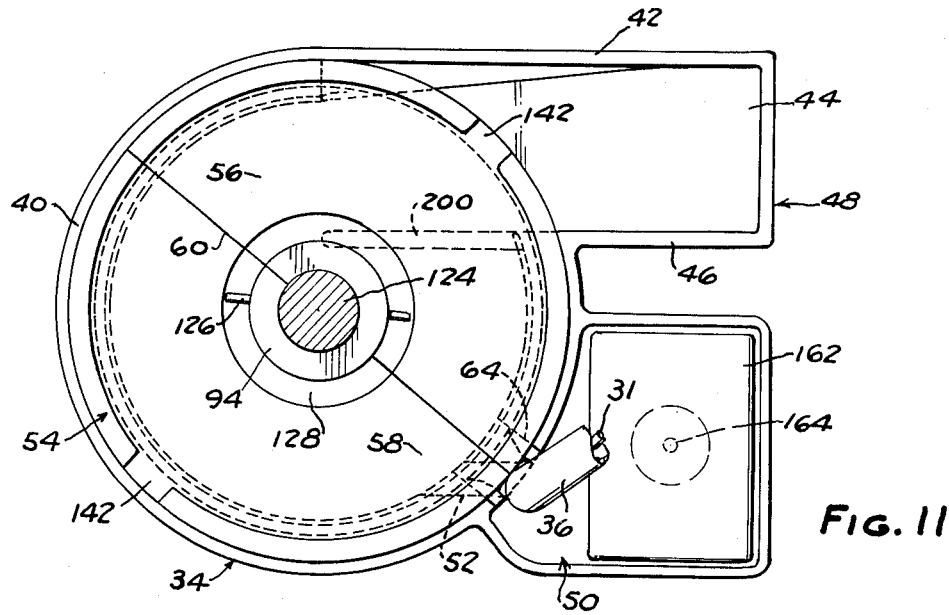
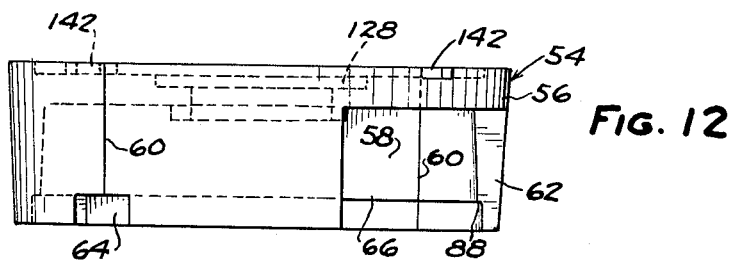
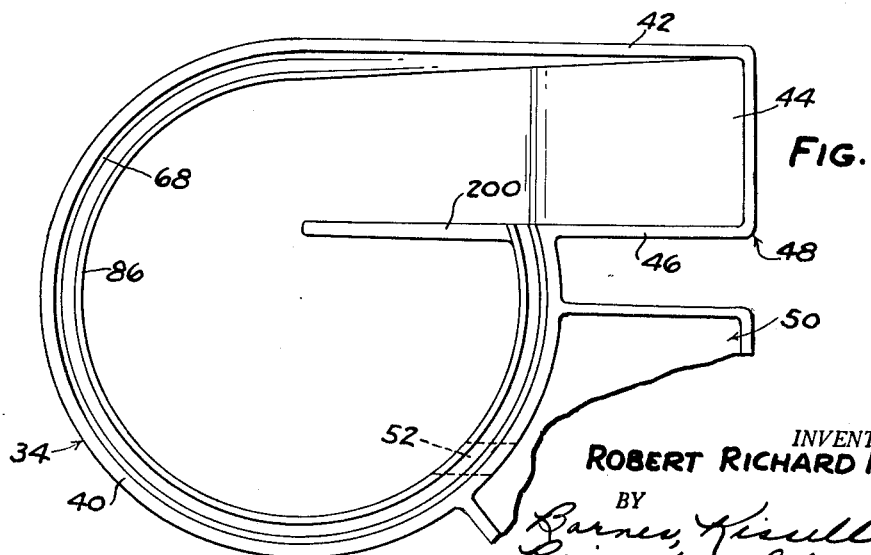

INVENTOR.
ROBERT RICHARD RADER

United States Patent Office 3,191,398
Patented June 29, 1965

3,191,398
APPARATUS FOR CONGEALING LIQUIDS
HAVING A MOVING SCRAPER
Robert Richard Rader, Port Huron, Mich., assignor to Mueller Brass Co., Port Huron, Mich., a corporation of Michigan
Filed Dec. 7, 1962, Ser. No. 243,110
20 Claims. (Cl. 62—138)

This invention relates to an apparatus for congealing liquids such as for making flake ice, slush ice, frozen confections, etc.

One of the objects of this invention is to provide an apparatus of the type described which is of relatively small compact size and relatively high capacity.

Another object of the invention resides in an apparatus of the type described having an improved means for discharging the frozen or congealed product.

A further object of the invention resides in an apparatus of the type described wherein the design of the housing of the freezing unit eliminates the necessity of gaskets and water seals.

A further object of the invention resides in a liquid congealing machine having a freezing unit that can be readily disassembled for cleaning and servicing.

Another object of the invention resides in a refrigerating apparatus of the type described provided with safety means for preventing operation of the compressor if the freezing unit becomes jammed in any way.

While the machine of this invention may take several forms depending on the liquid employed and the form of product to be produced, a specific embodiment thereof in the form of a flake ice making machine is shown in the drawings, in which:

FIG. 11 is a plan view of that portion of the ice freezing head below the mounting plate.

FIG. 12 is a side elevational view of the two halves of the evaporator housing cover.

FIG. 13 is a top plan view of the evaporator housing with the cover removed.

It will be appreciated as the description proceeds that while the machine illustrated is specifically designed to produce flake ice, the invention is applicable to a whole variety of machines such as for making slush ice, for making frozen confections, for concentrating liquids and for freezing substances generally into solids or semi-solids, the showing of a flake ice making machine being only for purposes of illustrating one embodiment of the invention.

Figure 1:
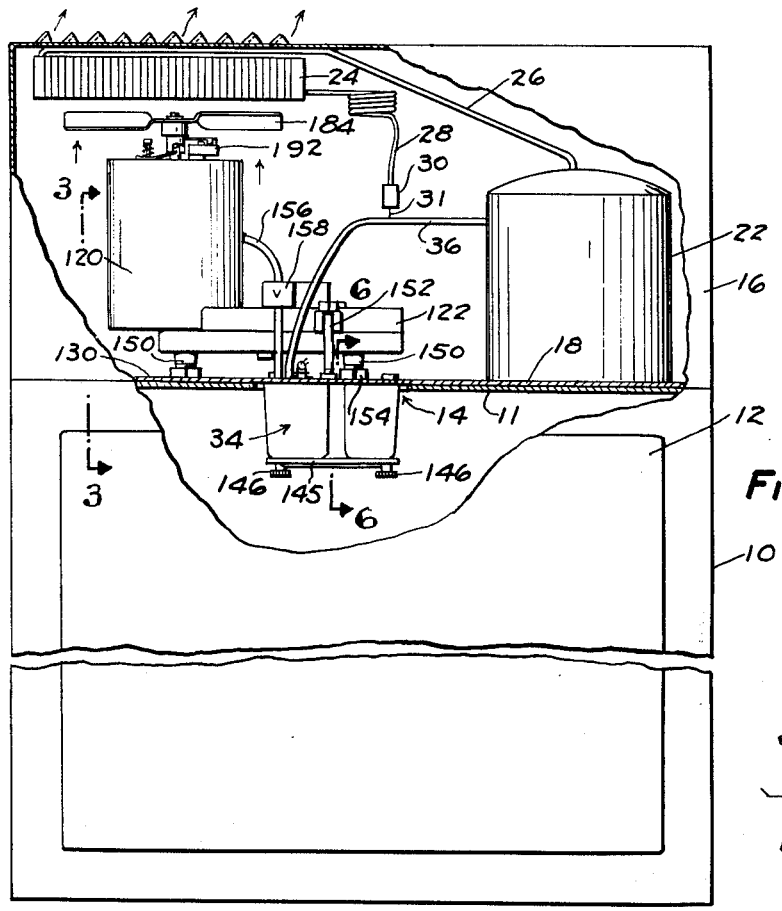
FIG. 1 is an elevational view partly in section of a flake ice machine according to the present invention mounted on a conventional ice storage chest.
Figure 3:
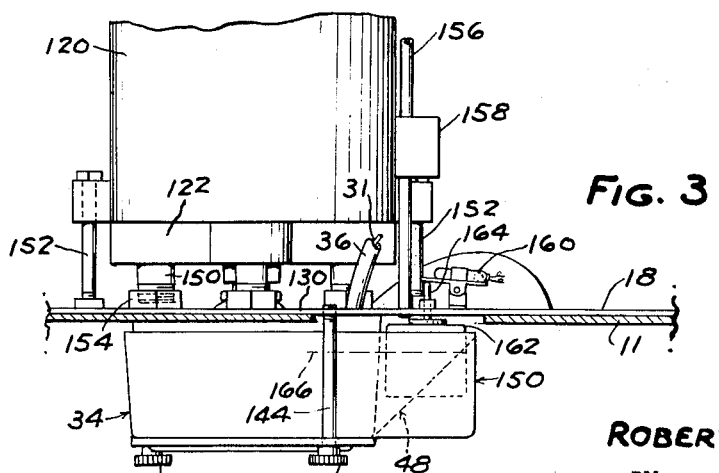
FIG. 3 is a fragmentary sectional view along the line 3—3 in FIG. 1.
Figure 7:
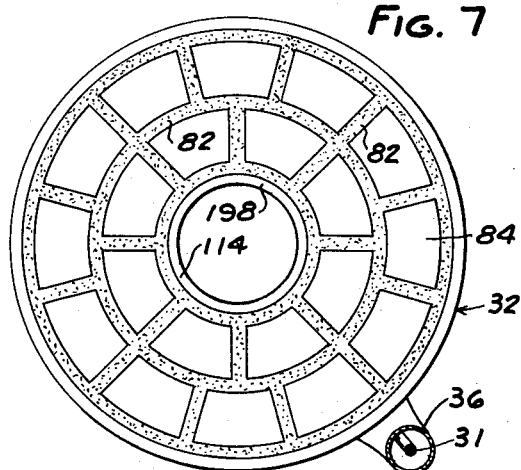
FIG. 7 is a top plan view of the evaporator in the ice head housing.
Figure 9:
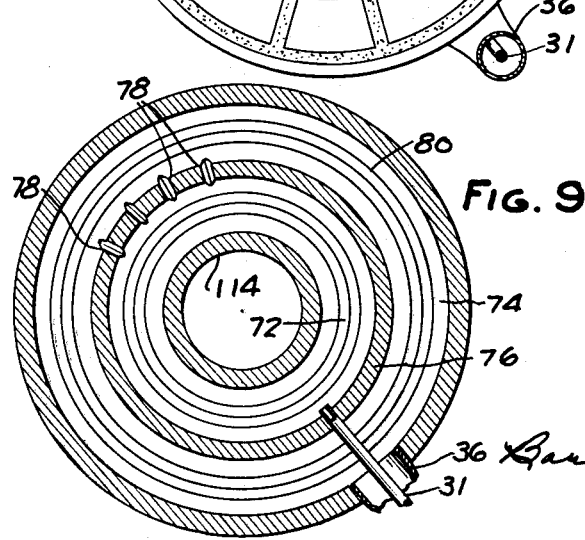
FIG. 9 is a sectional view of the evaporator along the line 9—9 in FIG. 10.
Figure 10:
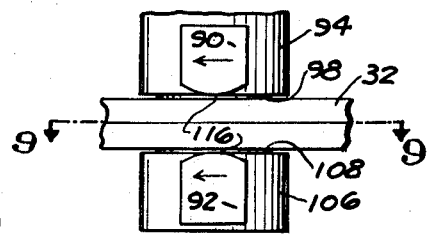
FIG. 10 is a fragmentary elevational view of the harvester bars and the evaporator.

Referring to the drawings and particularly to FIG. 1, a flake ice machine embodying this invention is adapted for use with a conventional ice storage chest 10 having an access door 12. The top wall 11 of chest 10 is apertured as at 14 and supports the flake ice making machine which is enclosed in a casing 16. The bottom wall or base pan 18 of casing 16 rests upon the top wall 11 of chest 10 and has an opening therein which registers with opening 14. The flake ice machine includes a motor-compressor 22 connected with a condenser 24 by means of a line 26. From the condenser 24 extends a liquid line 28 which connects with an expansion valve 30. Expansion valve 30 connects by means of a refrigerant line 31 with an evaporator 32 mounted within a housing 34 which depends through openings 14, 20. The inlet of motor-compressor 22 connects with evaporator 32 by means of a suction line 36. Adjacent the evaporator 32, the refrigerant line 31 extends concentrically within the suction line 36 as illustrated in FIGS. 3, 7 and 9.

Referring now to FIGS. 6 through 13, housing 34 has a bottom wall 38 and a generally cylindrical side wall 40. At one side thereof, the side wall 40 is extended tangentially as at 42 and cooperates with a wall 44 inclining upwardly from the bottom wall 38 and with another side wall 46 to form an ice exit chute 48. Circumferentially adjacent the ice exit chute 48, there is also formed on housing 34 a generally rectangular water supply chamber 50 which communicates with the interior of housing 34 through an opening 52 adjacent the bottom thereof. The upper end of the cylindrical portion of housing 34 is closed by a two-piece cover 54. The cover 54 comprises two halves 56 and 58 which join along a diametrical parting line 60. It will be noted that the parting line 60 is aligned with opening 52; and adjacent the opening 52, each cover half has its cylindrical skirt 62 notched at its lower edge as at 64 to accommodate the suction line 36. In addition, the skirt 62 of the cover half 56 is fashioned with a generally rectangular opening 66 therein which registers with the ice chute 48. The side wall 40 of housing 34 is relieved around its inner periphery as at 68 (FIG. 6) to receive the skirt 62 of the cover 54 with a close telescopic fit. The telescopically engaged surfaces of wall 40 and skirt 62 have a slight inward and downward taper.

Evaporator 32 is of the "pancake" type; namely, in the form of an annular disc having generally flat top and bottom surfaces 70. The evaporator is preferably formed from two discs of a good heat conducting material such as copper which are soldered together at their adjacent faces. The inner faces of the two halves of evaporator 32 are machined with spaced concentric grooves 72, 74. At one side of the evaporator, an aperture is provided into which the suction line 36 is braced and in line therewith, the rib 76 between the annular grooves 72, 74 is relieved to accommodate the extension of the refrigerant line 31. At the diametrically opposite side of the evaporator, rib 76 is formed with a plurality of radial passageways 78. Thus, with this arrangement, the refrigerant is conducted to the inner groove 72 and flows in opposite directions around the central portion of the evaporator to the passageways 78. Thereafter, it flows radially outwardly through the passageways 78, around the evaporator through the outer groove 74 and back to the suction line 36. This arrangement, together with the corrugated surfaces of the grooves, has proved to produce a maximum refrigerating effect.

The top and bottom faces of evaporator 32 have shallow circumferential and radial grooves 82 therein which are filled with a material such as a thermosetting resin that is a poor conductor of heat and to which ice does not readily adhere. Thus, the grooves 82 filled with resin provide a series of isolated flat metallic areas 84 on the opposite faces of the evaporator which form discrete spaced ice freezing areas.

It will be observed that the cylindrical wall 40 of housing 34 is formed with an annular shoulder 86 around its inner periphery and that the skirt 62 of cover 54 is formed with an opposed annular shoulder 88. Evaporator 32 is clamped in position within the housing between these two shoulders. It will be appreciated, however, that the suction line 36 extending through the skirt 62 and the side wall 40 into the water supply chamber 50 also assists in positioning of the evaporator.

For the purpose of removing the ice formed on the freezing areas 84 of the evaporator, there is provided a pair of harvester bars 90, 92. Harvester bar 90 extends radially from a hub 94 provided with a central bore 96 extending downwardly from its upper end. The upper end of hub 94 extends upwardly with a close fit through an opening 97 in cover 54. At its lower end, hub 94 is fashioned with a shank portion 98 of smaller diameter than hub 94 which forms a shoulder 100 at the junction between between hub 94 and shank portion 98. The lower end of shank portion 98 is fashioned into a threaded stud extension 102. Extension 102 is adapted to thread into a threaded socket 104 in a hub 106 from which the other ice harvester bar 92 extends radially. Hub 106, like hub 94, has a reduced shank portion 108 which is adapted to abut against the end of shank portion 98 and for controlling the axial spacing between the two harvester bars, one or more shims may be arranged between the abutting end faces of shank portions 98 and 108. Shank portion 108 joins with hub 106 at a shoulder 112. It will be noted that the shank portions 98, 108 have a diameter slightly less than the diameter of the central aperture 114 in evaporator 32. It will also be noted that as illustrated, shoulders 100 and 112 are spaced slightly axially from the plane of the top and bottom faces 70 of the evaporator.

Each harvester bar 90, 92 is fashioned with a rounded contour 116 along its radial edge adjacent its respective freezing face of the evaporator. It has been determined that the rounded contour at 116 produces a very desirable ice harvesting action with respect to the flakes of ice freezing on the freezing areas 84 of the evaporator. The harvester bars are adjusted relative to the evaporator such that the rounded edges 116 are spaced slightly from the opposite faces of the evaporator and as the harvester bars are rotated, the curved surfaces 116 compress and displace the ice flakes by a shearing action at the interface of the ice and evaporator rather than by a scraping action. If desired, and as illustrated in the drawings, each hub 94, 106 may be provided with a radially extending arm 118 diametrically opposite the harvester bar. In large capacity machines, additional harvester bar 90 may radiate from hubs 94, 106.

The means for rotating the harvester bars comprises an electric motor 120 which drives a gear reducer 122. Gear reducer 122 has an output shaft 124 extending downwardly into bore 96 in hub 94. A pin 126 extending through hub 94 and shaft 124 provides a driving connection to the harvester bars. Pin 126 is disposed in a circular recess 128 formed on the upper side of cover 54 around opening 97. The outer periphery of recess 128 prevents the pin from being displaced when the housing and cover are in assembled relation.

Figure 4:
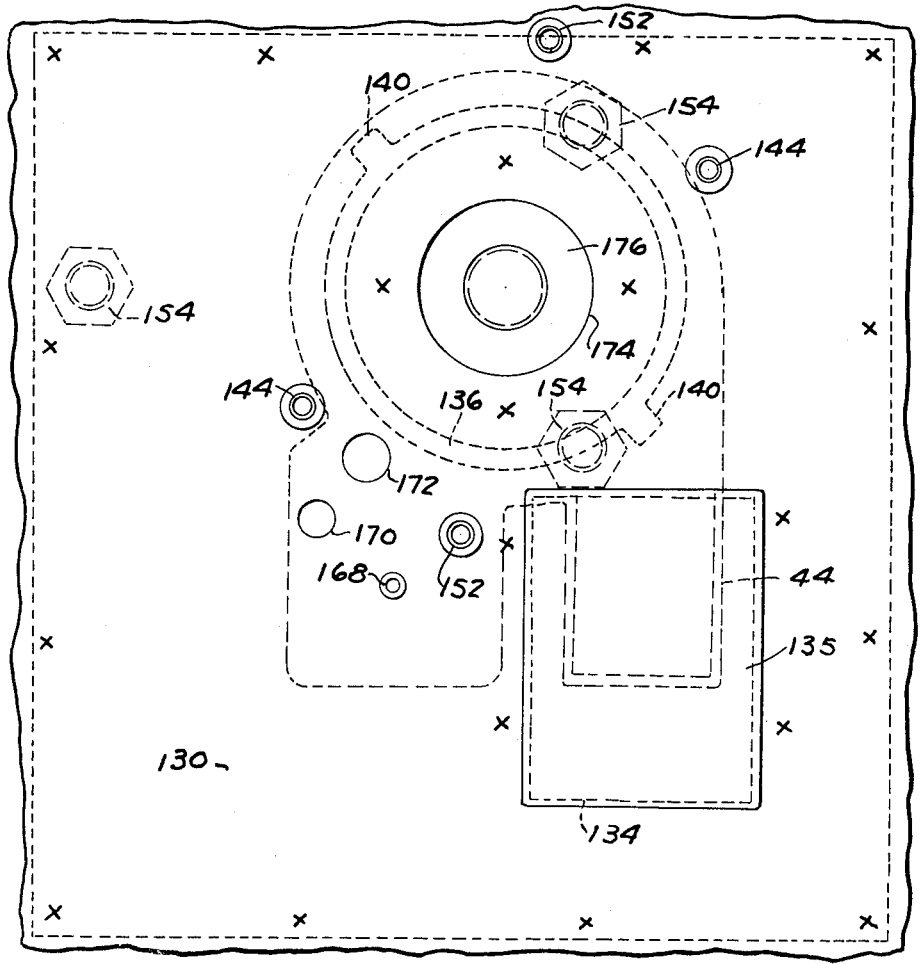
FIG. 4 is a top plan view of the mounting plate for the ice freezing unit.

Housing 34 with its cover 54 is supported on a mounting plate 130 (FIG. 4) which in the illustrated embodiment comprises an integral portion of the base pan 18 of casing 16. Plate 130 has a sheet of stainless steel 132 secured as by spot welding to the underside thereof. Plate 130 and sheet 132 are suitably as at 134 directly above the chute 48. A tightly fitting cover 135 is fitted over aperture 134. Sheet 132 is fashioned with a circular embossment 136 which engages rib 138 on cover 54 for centering housing 34 on plate 130. In addition, the circular embossment 136 is fashioned with a pair of diametrically opposite, radial extensions 140 (FIG. 4) which are adapted to seat in notches 142 (FIGS. 11 and 12) to prevent relative rotation between cover 54 and mounting plate 130. The housing assembly is secured to mounting plate 130 by means of a pair of screws 144 which extend upwardly through a base plate 145 beneath housing 34 and into threaded openings in mounting plate 130. The heads or lower ends of screws 144 are provided with wing portions 146 to enable tightening and loosening of these screws manually. The gear reducer 122 with its motor 120 is also positioned on mounting plate 130 by means of pins 148 which project into sockets in legs 150 on gear reducer 122. A pair of motor tie bolts 152 securely mounts the gear motor assembly on mounting plate 130. The gear motor assembly may be levelled on mounting plate 130 by means of nuts 154 threaded on the lower end of legs 150.

Water from a suitable source is conducted to the water supply chamber 50 by a line 156 controlled by a solenoid valve 158 (FIGS. 1 and 3). The operation of valve 158 is in turn controlled by a pivotally supported mercury switch 160. A free float 162 within water supply chamber 50 is arranged to actuate a vertically shiftable stem 164 that controls operation of switch 160 in accordance with the water level in housing 34. The switch is adjusted to maintain water in housing 34 at a level above the top face of evaporator 32, generally at the level designated 166 in FIGS. 3 and 6. Mounting plate 130 is suitably apertured to accommodate the float valve stem 164 at 168, the water inlet line 156 at 170 and the exhaust line 36 at 172. Mounting plate 130 is also apertured at 174 to accommodate shaft 124 which drives the harvester bars. However, opening 174 is substantially larger in diameter than shaft 124 and sheet 132 is fashioned with an upwardly conical embossment 176 at opening 174 to overlie the upper end of hub 94. Directly above the conical embossment 176, an oil slinger 178 is mounted on shaft 124 to prevent oil from dripping down into the freezing chamber of the head.

Figure 5:
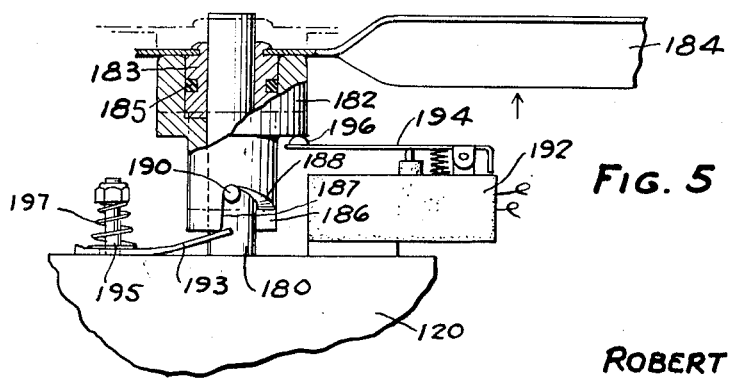
FIG. 5 is a fragmentary elevational view, partly in section, showing the safety control means for rendering the compressor inoperative in case of a "freeze-up" of the ice head.

Referring now to FIGS. 1 and 5, the upper end of motor shaft 180 extends freely through a bushing 182 which receives the hub 183 of a fan 184. Fan 184 is arranged for conducting a stream of air over the coils of condenser 24. A rubber O-ring 185 forms a clutch between hub 183 and bushing 182 which is adapted to slip under an impact drive. The lower end of bushing 182 is fashioned with a circumferentially extending notch defined at opposite ends by axially extending shoulders 187 and 186. These shoulders are connected by a cam surface 188 which inclines upwardly from shoulder 186 to shoulder 187. Bushing 182 is supported on shaft 180 by means of a pin 190 engaging the cam surface 188. Adjacent shaft 180 on motor 120, there is arranged a switch 192 having a pivotally supported and spring biased arm 194, the free end of which engages an undersurface 196 on the bushing 182. Switch 192 is connected to open and close the electrical circuit to the motor-compressor unit 22. When the high side of cam 188 engages pin 190 as shown in FIG. 5, switch arm 194 is depressed and the circuit to the motor-compressor unit 22 is opened. When the low side of cam surface 188 engages pin 190, arm 194, by reason of its spring bias, pivots upwardly and closes the circuit to motor-compressor unit 22. In the arrangement shown, shaft 180 rotates in a counterclockwise direction as viewed from above when the motor 120 is energized. A detent 193 mounted on a stud 195 and lightly biased by a light helical spring 197 prevents rotation of fan 184 in a clockwise direction and also prevents reverse drive of the harvester bars if driven by a shaded pole motor.

Figure 2:
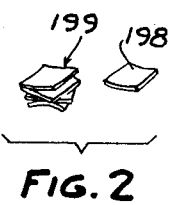
FIG. 2 is a perspective view showing generally the type of ice flakes or chips produced by the machine.

In operation, when motor 120 is energized, if the harvester bars 90, 92 are free to rotate, shaft 180 rotates in a counterclockwise direction and since bushing 182 is free on the upper end of shaft 180, bushing 182 is elevated by pin 190 to close the circuit to the motor-compressor unit 22. If for some reason the ice making head should be jammed or frozen when motor 120 is energized so that motor 120 stalls, the circuit to the motor-compressor unit 22 will remain open and thus, the condition will not become aggravated. As the refrigerant directed into the evaporator through the line 31 expands and travels around within evaporator 32, ice is caused to form on the spaced freezing areas 84 on the opposite faces of the evaporator. Ice, of course, will also form around the inner periphery of the central opening 114 in the evaporator as well as a narrow annular band 198 (FIG. 7) on the opposite faces of the evaporator extending around the opposite ends of central aperture 114 around shank portions 98 and 103 and at the annular bands 198 actually provides a bearing for the harvester bars which substantially reduces and dampens the impact on the bearings which otherwise support shaft 124. As the harvester bars rotate (in a clockwise direction as viewed from above), the curved edges 116 thereof engage the ice flakes formed and bodily shear them from the areas 84 on the opposite faces of the evaporator. The discrete ice chunks thus removed from the faces of evaporator 32 are advanced in a clockwise direction by the harvester bars as well as the arms 118. Thus, the discrete ice chunks 198 progressively agglomerate into larger masses 199 (FIG. 2) as they advance around the housing.

Figure 6:
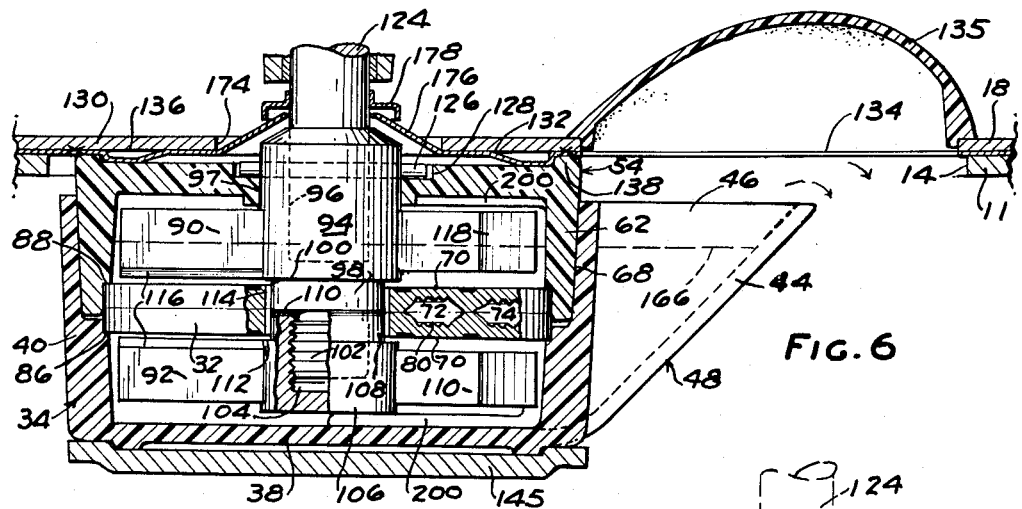
FIG. 6 is a fragmentary sectional view along the line 6—6 in FIG. 1.
Figure 8:
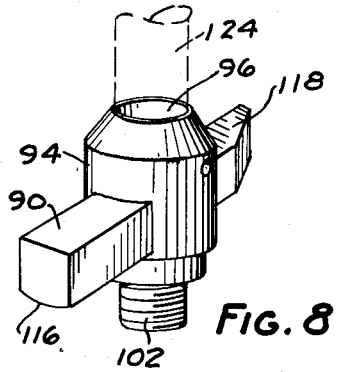
FIG. 8 is a perspective view of the upper ice harvester bar.

Referring now to FIGS. 6, 11 and 13, it will be noted that the bottom wall of housing 34 and the top wall of cover 54 are each formed with a projecting rib or ridge 200. These two ribs or ridges are axially aligned one above the other and extend generally radially inwardly in line with wall 46 and ice exit chute 48. Ribs 200 project closely into the plane of rotation of the radial edges of bars 90, 92 opposite the curved edges 116. When the ice flake masses which build up ahead of the harvester bars advance toward the exit chute 48, they encounter the ribs 200 and are directed outwardly through the chute 48. In the absence of these ribs or ridges 200, there would be a tendency for the ice flake masses to simply revolve about and within the housing 34 to form a more or less solid mass of ice. However, the provision of the ribs 200 assures direction and deflection of the ice flake masses out through the exit chute 48 as the harvester bars rotate.

It will be noted from an examination of FIGS. 1, 3 and 6 that the ice freezing head, comprising the housing 34 and its associated components, protrudes downwardly from the bottom of housing 16 and through the opening 14 in the top wall of the ice storage chest 10. In this position, it not only absorbs heat from the ice storage chest but is also readily accessible for servicing and cleaning. To remove the housing assembly, it is merely necessary to remove screws 144. When these screws are removed, housing 34 can be withdrawn downwardly from telescopic engagement with the inwardly tapered skirt 62 of cover 54. Thereafter, the two halves 56, 58 of cover 54 can be separated radially to remove them. It is then a simple matter to remove the harvester bar assembly from shaft 124 by merely withdrawing pin 126. Obviously, the assembly of the housing unit can be accomplished just as easily and quickly. After the harvester bar assembly is secured to shaft 124 by pin 126, the two halves 56, 58 of cover 54 are brought together around hub 94 so as to interengage the embossed extensions 140 with notches 142 on the cover. Thereafter, the housing 34 is telescoped upwardly over the skirt 62 and secured firmly in place by tightening the screws 144 against the bottom supporting plate 145. It will be observed that the axial spacing between the curved edges 116 of the harvester bars can be adjusted in relation to the opposite faces of evaporator 32 by the use of shims of proper thickness as at 110. It will also be appreciated that with the above arrangement, the need for gaskets or water seals on the ice head assembly is completely eliminated.

Figure 14:
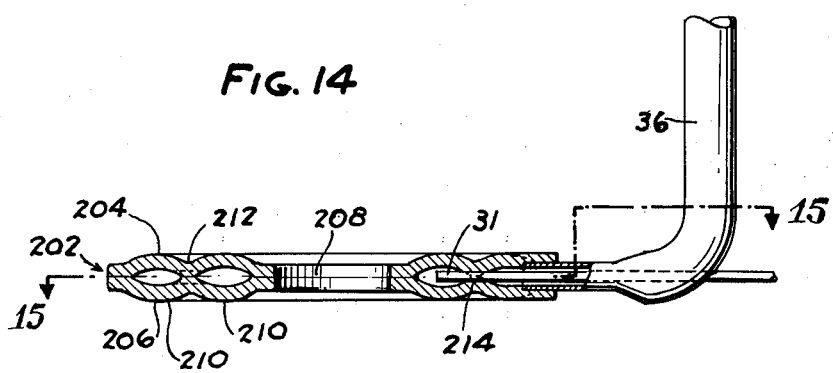
FIG. 14 is a vertical sectional view through an evaporator of modified construction.
Figure 15:
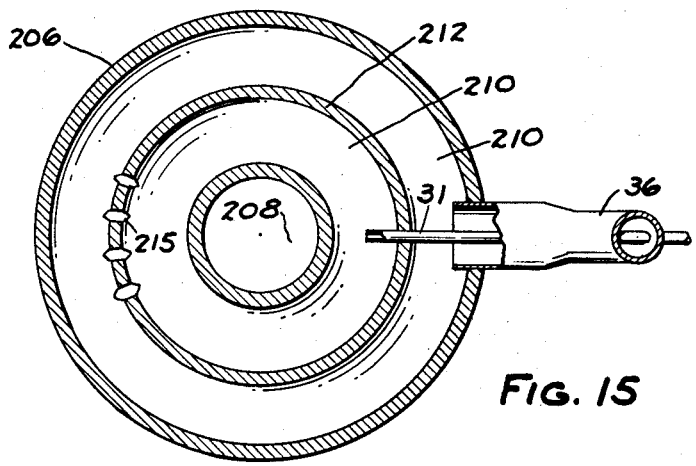
FIG. 15 is a sectional view along the line 15—15 in FIG. 14.
Figure 16:
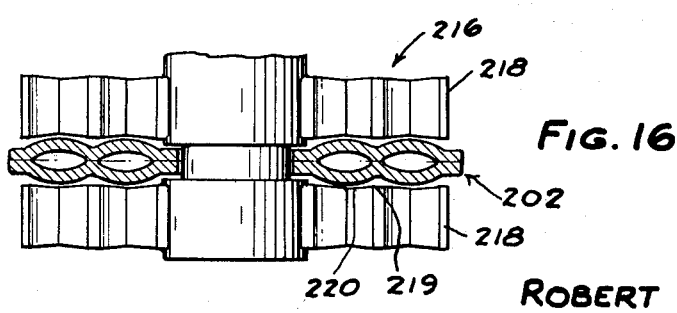
FIG. 16 is a vertical sectional view similar to FIG. 14 and showing the assembly of ice harvester bars modified to cooperate with the evaporator of modified construction.

In FIGS. 14 through 16, there is illustrated a modified form of evaporator and harvester bar. The evaporator generally designated 202 comprises two half sections 204, 206 in the form of annular discs having a central opening 208. Each half section is formed as a stamping with concentric corrugations forming annular humps 210 radially separated by a concentric valley 212. At one side, the discs are shaped to accommodate the suction line 36 which is brazed in place to form a sealed connection with the evaporator. The valley portion 212 of each disc is also relieved as at 214 to accommodate the liquid line 31 and at 215 to form radial communicating ports between the inner and outer fluid passageways of the evaporator. In assembly, the two discs are placed one upon the other as illustrated and their inner and outer peripheries are welded together.

The harvester bar assembly 216 is generally similar to that previously described, the primary difference being that the harvester bars 218 are configured such that the ice harvesting edges are formed with humps 219 and depressions 220 to generally conform with the outer surface contour of the evaporator 202 in radial section. The evaporator 202 is characterized by its simplicity and low cost and may be used where the production of a wet, soft iced product is acceptable.

I claim:

1. In a machine of the type described, a freezing unit comprising a housing having an annular evaporator mounted therein, means for directing material to be frozen into said housing into contact with the evaporator, said evaporator having a central circular cylindrical opening with its axis extending vertically, a driven shaft extending vertically downwardly through the evaporator, the portion of the shaft extending through the evaporator being of smooth, circular, cylindrical shape and having a diameter slightly smaller than said opening to form a uniform annular gap therebetween of substantially greater size than required for manufacturing tolerances, the peripheral surface portion of the evaporator forming said opening comprising a freezing surface whereby an annular layer of frozen material which serves as a radial bearing for said shaft is adapted to form in said gap between the opening and the smooth, cylindrical portion of the shaft extending through the opening, means for supplying refrigerant to the evaporator and a pair of harvester bars extending radially from the shaft one above the other below the evaporator.

2. In a machine of the type described, an ice freezing unit comprising a housing having an annular evaporator mounted therein, said evaporator having a central circular, cylindrical opening extending from one face of the evaporator to the opposite face thereof, said opposite faces and the peripheral surface portion of the evaporator forming said opening providing freezing surfaces, means for directing material to be frozen into said housing into contact with said freezing surfaces, a driven shaft extending into said housing and through said opening, the portion of said shaft extending through said opening being of smooth, circular, cylindrical shape and having a diameter slightly smaller than said opening to form a uniform annular gap therebetween of substantially greater size than required for manufacturing tolerances whereby an annular layer of frozen material which serves as a radial bearing for said shaft is adapted to form between the shaft and the opening, means for supplying refrigerant to the evaporator and a pair of harvest bars extending radially from the shaft one adjacent each of the opposite faces of the evaporator.

3. The combination set forth in claim 2 wherein the shaft is formed with radially enlarged shoulders adjacent the ends of the portion extending through the central opening in the evaporator, said shoulders being spaced slightly from and radially overlapping the opposite faces of the evaporator whereby the materal freezing between said shoulders and the opposite faces of the evaporator also serves as a bearing.

4. In a machine of the type described, a freezing unit comprising a housing, an annular evaporator mounted in the housing, means for supplying refrigerant to the evaporator and liquid to be frozen to the housing, said evaporator having opposite faces and a central aperture extending from one of said faces to the other, a pair of radially extending harvester bars for removing the frozen product from the opposite faces of the evaporator, said bars being connected by a shank which extends through said central opening in the evaporator, said shank comprising two threadedly connected sections one of which is integral with one of the bars and the other of which is integral with the other bar, said sections having radially disposed shoulders adjacent the threaded connection for limiting the extent to which the sections may be advanced toward one another to thereby limit the space between each harvester bar and its respective face of the evaporator, said shoulders forming seats adapted to receive shims therebetween to thereby control the space relation between each bar and its respective face of the evaporator.

5. The combination set forth in claim 4 wherein the evaporator has its central axis extending vertically so that said opposite faces comprise the upper and lower faces of the evaporator, said shank being provided with a vertical bore extending to the upper end of the shank and adapted to receive the lower end of a power driven shaft for rotating the harvester bars.

6. The combination set forth in claim 5 wherein said housing is open at the top and including a centrally apertured cover closing the upper end of the housing, said cover having a counterbore around the central opening therein, said shank at its upper end extending upwardly through said central opening in the cover and having a transverse hole therein at the level of the counterbore to receive a pin for connecting said shank with a driven shaft extending downwardly into the bore of the shank.

7. The combination set forth in claim 6 wherein said cover is fashioned with a depending peripheral skirt telescopically engaged with the side wall of the casing, said cover being divided diametrically into two half sections.

8. In a machine of the type described, an ice freezing unit comprising a generally cylindrical housing having a side wall and having an ice exit chute at one side thereof extending outwardly from said side wall from the interior of said housing, said housing having generally flat end walls at opposite ends of the side wall, an annular evaporator in the housing having opposed product freezing faces spaced axially inwardly from the end walls of the housing, means for supplying refrigerant to said evaporator and liquid to be frozen to said housing, said evaporator having a central aperture extending therethrough, a driven shaft extending through the central aperture in the evaporator and having a pair of harvesting bars mounted to rotate therewith, one on each side of the evaporator, said bars each having one edge disposed adjacent its respective ice freezing face on the evaporator such that when the bars are rotated, said edges engage and displace the product frozen on said freezing faces, the opposite edge of each bar being spaced from its respective end wall of the housing, each of said end walls having an inwardly projecting rib thereon extending inwardly from said chute generally towards the central axis of the housing for directing the frozen product displaced by said bars outwardly through the chute in response to rotation of the bars.

9. The combination set forth in claim 8 wherein said ribs project axially inwardly of the housing to adjacent the plane of rotation of said last mentioned edges of the harvester bars.

10. The combination set forth in claim 9 wherein said housing has its central axis extending vertically and said end walls comprise the top and bottom walls of the housing.

11. In a machine of the type described, the combination of a housing, an evaporator in the housing, said evaporator having a freezing surface, means for directing the product to be frozen to said surface of the evaporator, and for directing refrigerant into the evaporator, a motor-compressor unit connected with the evaporator, a frozen product harvester bar, a motor independent of said motor-compressor unit having a drive shaft conected at one end for rotating the harvester bar over said freezing surface of the evaporator to remove the product frozen thereon, the opposite end of the drive shaft of the last mentioned motor projecting upwardly and supporting a fan having a central hub, the hub of said fan being journalled on the upper end of said last mentioned drive shaft, a rotary cam driving connection between the hub of the fan and the drive shaft arranged such that the hub of the fan is displaced axially of the shaft in response to rotation of the drive shaft and switch means actuated by axial displacement of the hub of said fan for conditioning the circuit to the motor-compressor unit for operation whereby when the harvester bar driving motor stalls, the circuit to the motor-compressor unit is opened.

12. The combination called for in claim 11 wherein said rotary cam connection comprises a slot in said hub inclined obliquely to the axis of the drive shaft and a pin extending transversely through the drive shaft and engaging said slot.

13. In a machine of the type described, an ice freezing unit comprising a generally horizontally disposed mounting plate, a housing positioned below the mounting plate and having a bottom wall and a generally cylindrical upright side wall, an annular evaporator mounted within the housing and having a central aperture extending vertically therethrough, a cover for closing the upper end of the housing, said cover being split diametrically into two half sections and having a central opening therein coaxial with the central opening in the evaporator, said mounting plate having an aperture therein aligned axially with the central apertures in the cover and the evaporator, a drive shaft extending downwardly through said apertures and having a pair of harvester bars mounted thereon within the housing one above and one below the evaporator, means for supplying liquid to be frozen to the housing and refrigerant to the evaporator and means clamping the two half sections of the cover downwardly on the housing, said last-mentioned means also mounting the housing on the underside of the mounting plate.

14. The combination set forth in claim 13 wherein said shaft comprises two sections telescopically connected at the portion thereof extending through said cover, a pin extending transversely through said two sections of the shaft at said telescopic connection for coupling said two sections together, said cover having an annular recess surrounding the central opening therein in which said pin is free to rotate, said recess being of a size to prevent the pin from being withdrawn from the two sections of the shaft when the housing and cover are in assembled relation.

15. The combination set forth in claim 14 wherein said cover has a depending peripheral skirt telescopically engaging the side wall of the housing.

16. The combination set forth in claim 14 wherein said mounting means comprise a support plate positioned beneath and against the bottom wall of the housing and screws extending upwardly through said support plate and threaded into said mounting plate to urge the housing and cover upwardly against the underside of the mounting plate.

17. In a machine of the type described, an evaporator comprising a pair of centrally apertured annular discs, said discs being juxtaposed one on the other with the inner and outer peripheries of the two discs together, said discs having on their inner faces a pair of radially spaced concentric annular grooves separated by an annular rib, a refrigerant suction line connected to the periphery of said evaporator at one side thereof and communicating with the outer annular groove, said rib having a recess therethrough in radial alignment with said suction line, a refrigerant line of smaller diameter than the suction line disposed within said suction line and extending radially into said recess so as to communicate at its one end with the inner annular groove, said rib having at a portion thereof generally diametrically opposite said recess a radial passageway therein establishing communication between the inner and outer annular grooves.

18. The combination set forth in claim 17 wherein said discs each comprise a stamping having a plurality of concentric annular corrugations therein, said rib and grooves being defined by said corrugations.

19. The combination set forth in claim 18 including a fused metal connection between said discs around the inner and outer peripheries thereof.

20. In a machine of the type described, a freezing unit comprising a generally cylindrical housing formed with a generally cylindrical side wall and an end wall, one end of the housing being open, an annular cover closing the open end of the housing, said cover being formed with a central aperture, means for delivering liquid to be frozen into said housing, the housing having a discharge opening therein for frozen material, a centrally apertured annular evaporator in the housing having its central axis generally coaxial with the central axis of the housing, means for delivering refrigerant to said evaporator, a power-driven shaft extending through the central apertures in the cover and the evaporator, said shaft having a pair of harvester bars extending radially therefrom and adapted to remove the frozen material from the opposite faces of the evaporator when the shaft is rotated, said side wall of the housing being formed around its inner periphery with a circumferentially extending shoulder which faces the open end of the housing, the outer peripheral portion of the evaporator being seated on said shoulder, said cover having a skirt telescopically received within the cylindrical side wall of the housing, the free edge portion of the skirt engaging the evaporator at the side thereof opposite said shoulder and means securing the cover and the housing against axial separation to thereby clamp the evaporator between the shoulder on the housing and the free edge portion of the cover skirt.

References Cited by the Examiner
UNITED STATES PATENTS

| | | | |
|---|---|---|---|
| 799,261 | 9/05 | Pratts | 165—94 |
| 1,430,900 | 10/22 | Haferkamp | 62—354 X |
| 1,936,575 | 11/33 | Barrett et al. | 62—515 X |
| 2,054,841 | 9/36 | Taylor | 62—525 X |
| 2,145,331 | 1/39 | Arensberg | 62—354 X |
| 2,449,730 | 9/48 | Taylor | 62—354 |
| 2,521,040 | 9/50 | Casetta | 165—66 X |
| 2,863,304 | 12/58 | Taylor | 165—94 X |
| 2,867,987 | 1/59 | MacLeod et al. | 62—71 |
| 2,962,878 | 12/60 | Keller | 62—354 |
| 3,101,598 | 8/63 | Ross | 62—354 |
| 3,108,449 | 10/63 | Lents | 62—354 X |

ROBERT A. O'LEARY, *Primary Examiner.*

MEYER PERLIN, *Examiner.*